(12) United States Patent
Brown et al.

(10) Patent No.: US 8,851,374 B2
(45) Date of Patent: Oct. 7, 2014

(54) COUPON DEVICE

(75) Inventors: Devin S. Brown, Durham, NC (US);
Hector L. Rivera, Raleigh, NC (US);
Christopher D. Arrington, Morrisville, NC (US); William K. Diehl, Durham, NC (US)

(73) Assignee: Toshiba Global Commerce Solutions Holding Corporation, Tokyo (JP)

( * ) Notice: Subject to any disclaimer, the term of this patent is extended or adjusted under 35 U.S.C. 154(b) by 1238 days.

(21) Appl. No.: 12/647,330

(22) Filed: Dec. 24, 2009

(65) Prior Publication Data

US 2011/0155805 A1 Jun. 30, 2011

(51) Int. Cl.
*G06K 15/00* (2006.01)
*G07G 1/00* (2006.01)
*G07G 1/14* (2006.01)
*G06Q 20/38* (2012.01)

(52) U.S. Cl.
CPC ............. *G07G 1/0045* (2013.01); *G07G 1/145* (2013.01); *G06Q 20/387* (2013.01)
USPC ........................ 235/383; 235/375; 235/462.01

(58) Field of Classification Search
USPC ............ 235/375, 383, 439, 454, 462.01, 470, 235/475
See application file for complete search history.

(56) References Cited

U.S. PATENT DOCUMENTS

| | | | | |
|---|---|---|---|---|
| 3,487,905 A * | 1/1970 | Frazier, Sr. | ................ | 194/210 |
| 5,208,445 A * | 5/1993 | Nahar et al. | ................ | 235/375 |
| 5,819,954 A | 10/1998 | Lacriola | | |
| 5,844,221 A * | 12/1998 | Madigan et al. | ............... | 235/383 |
| RE37,166 E | 5/2001 | Rando et al. | | |
| 7,048,184 B2 | 5/2006 | Persky | | |
| 7,204,346 B2 | 4/2007 | Kurtz et al. | | |
| 2002/0055875 A1* | 5/2002 | Schulze et al. | ................... | 705/14 |
| 2003/0001007 A1 | 1/2003 | Lee et al. | | |
| 2003/0204442 A1* | 10/2003 | Marshall | ........................ | 705/14 |
| 2005/0171841 A1 | 8/2005 | Prorock et al. | | |
| 2007/0235531 A1 | 10/2007 | Addison et al. | | |
| 2008/0029534 A1 | 2/2008 | Borgryd | | |
| 2008/0144916 A1* | 6/2008 | Vent | .............................. | 382/133 |
| 2008/0243620 A1 | 10/2008 | Prorock et al. | | |
| 2008/0289301 A1* | 11/2008 | Gallimore | ....................... | 53/435 |
| 2009/0192837 A1* | 7/2009 | Templer et al. | ................... | 705/7 |

OTHER PUBLICATIONS

"Method to Verify the Deposit of a scanned Coupon into the coupon Receptacle, Thus Preventing Coupon Reuse in the Future", ip.com, IPCOM000169189D, Apr. 9, 2008.

* cited by examiner

*Primary Examiner* — Paultep Savusdiphol
(74) *Attorney, Agent, or Firm* — Michael Dryja (57) ABSTRACT

A device includes first, second, and third components. The first component scans a coupon. The coupon is moved from the first component to the second component after the first component scans the coupon and the coupon has been validated. The second component holds the coupon and other coupons associated with just the current checkout session until the current session has been successfully completed, at which time the coupons are moved in unison from the second component to the third component. The third component stores these coupons, together with additional coupons associated with other checkout sessions. The first component returns the coupon where validation of the coupon has failed. The second coupon permits a user to retrieve the coupons associated with just the current checkout session where the current checkout session has been unsuccessfully completed, without the user having to look through the coupons associated with the other checkout sessions.

18 Claims, 6 Drawing Sheets

COUPON DEVICE

FIELD OF THE INVENTION

The present invention relates generally to physical coupons, such as those used by customers in retail establishments like grocery stores. The present invention more particularly relates to a device having components to scan the coupon, to temporarily store all the coupons associated with a current checkout session, and to indefinitely store the coupons associated with the current checkout session and with other checkout sessions.

BACKGROUND OF THE INVENTION

In retail establishments like grocery stores, self-service checkouts have become increasingly popular. In a traditional checkout, an employee of a retail establishment typically scans the items that a customer wants to purchase, bags the items, and assists the customer in paying for the items. By comparison, in a self-service checkout, the customer him or herself scans, bags, and pays for the items, and receives assistance from an employee of the retail establishment only if there is a problem.

Many customers use physical coupons, which are typically pieces of paper that have bar codes on them that when scanned discount the prices of their associated items by given amounts or percentages. In a traditional checkout, the customer hands the employee all his or her coupons, and the employee scans the coupons one at a time and then places the coupons in an envelope or storage container so that the coupons cannot be used again. In a self-service checkout, the customer scans the coupons him or herself, and then is supposed to place the coupons in a secure storage container, or give the coupons to an employee when leaving the retail establishment, so that the coupons cannot be used again.

SUMMARY OF THE INVENTION

A device according to an embodiment of the invention includes a first component, a second component, and a third component. The first component scans a physical coupon associated with a current checkout session. The physical coupon is moved from the first component to the second component after the first component scans the physical coupon and the physical coupon has been validated. The second component holds the physical coupon and any other physical coupons associated with just the current checkout session until the current checkout session has been successfully completed. The physical coupon and any other physical coupons associated with the current checkout session are moved in unison from the second component to the third component once the current checkout session has been successfully completed. The third component stores the physical coupon and any other physical coupons associated with the current checkout session, together with additional physical coupons associated with other checkout sessions. The first component returns the physical coupon where validation of the physical coupon has failed. The second component permits a user to retrieve the physical coupon and any other physical coupons associated with just the current checkout session where the current checkout session has been unsuccessfully completed, without the user having to look through the additional physical coupons associated with the other checkout sessions.

A device according to another embodiment of the invention includes first, second, and third means. The first means is for scanning a physical coupon associated with a current checkout session. The physical coupon is moved from the first means to the second means after the first means scans the physical coupon and the physical coupon has been validated. The second means is for holding the physical coupon and any other physical coupons associated with just the current checkout session until the current checkout session has been successfully completed. The physical coupon and any other physical coupons associated with the current checkout session are moved in unison from the second means to the third means once the current checkout session has been successfully completed. The third means is for storing the physical coupon and any other physical coupons associated with the current checkout session, together with additional physical coupons associated with other checkout sessions. The first means returns the physical coupon where validation of the physical coupon has failed. The second means permits a user to retrieve the physical coupon and any other physical coupons associated with just the current checkout session where the current checkout session has been unsuccessfully completed, without the user having to look through the additional physical coupons associated with the other checkout sessions.

In a method of an embodiment of the invention, a customer places a physical coupon associated with a current checkout session on or in a first component of a device. After the physical coupon has been placed on or in the first component, the first component scans the physical coupon. After the physical coupon has been scanned by the first component and after the physical coupon has been validated, the method causes the physical coupon to move from the first component to a second component of the device. The second component holds the physical coupon and any other physical coupons associated with just the current checkout session until the current checkout session has been successfully completed. Once the current checkout session has been successfully completed, the method causes the physical coupon and any other physical coupon associated with the current checkout session to move from the second component to a third component of the device. The third component stores the physical coupon and any other physical coupon associated with the current checkout session, together with additional physical coupons associated with other checkout sessions. The first component returns the physical coupon where validation of the physical coupon has failed. The second component permits a user to retrieve the physical coupon and any other physical coupons associated with just the current checkout session where the current checkout session has been unsuccessfully completed, without the user having to look through the additional physical coupons associated with the other checkout sessions.

DETAILED DESCRIPTION OF THE DRAWINGS

As noted in the background section, when a customer uses coupons in a self-service checkout, the customer scans the coupons him or herself, and then is supposed to place the coupons in a secure storage container, or give the coupons to an employee when leaving the establishment. Doing so ensures that the coupons cannot be used again, by the same customer or by a different customer. However, the customer may not, and instead keep the coupons to improperly use again. The customer may simply not place the coupons in the secure storage container or give them to an employee when leaving the establishment. Alternatively, the customer may place different coupons in the secure storage container—not those that the customer actually used—or give the employee different coupons when leaving the establishment.

The secure storage container is generally a lockable box having a slot in which customers can insert coupons after they have scanned the coupons. A customer may thus scan one coupon, place it into the container, scan the next coupon, place it into the container, and so on, until all the coupons have been scanned and placed into the container. A situation may occur in which the customer decides that he or she really does not want to purchase a given item against which a particular coupon has been applied, or even decides to not purchase any items. In such cases, the customer will want one or more coupons back, since the customer will not have actually used the coupons to purchase items.

However, it is difficult to give the customer his or her coupons back. First, the customer has to receive the assistance of an employee to open the secure storage container so that the customer can retrieve the coupons, and the employee may be busy helping other customers at the moment. Second, the secure storage container stores the coupons for all checkout sessions, not just the current checkout session of the current customer. (A checkout session is defined as the scanning of all the items that a customer wishes to purchase at a given time, beginning with the scanning of the first item, ending with payment for all the items that have been scanned, and including the redemption of any coupons that the customer wants to use.) Therefore, even when the customer is given access to the container, he or she may have to look through a large number of coupons to locate the coupons that the customer wants back. Furthermore, the employee has no easy way to determine whether the customer is taking back the correct coupons.

Figure 1:
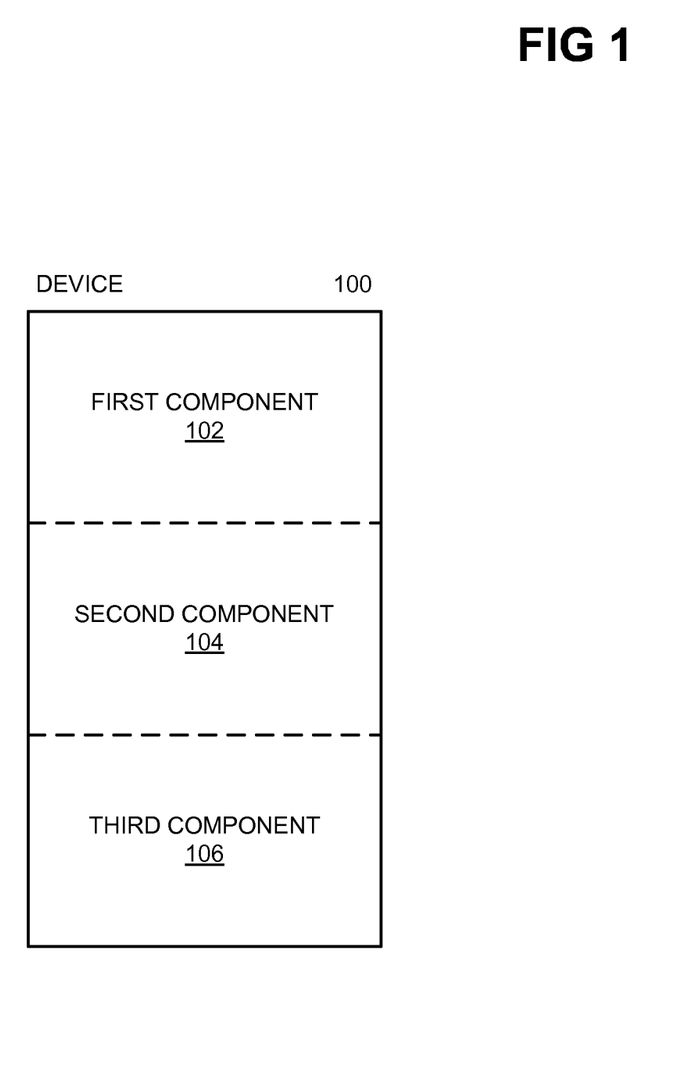
FIG. 1 is a diagram of a device, according to a general embodiment of the present invention.

FIG. 1 shows a diagram of a device 100, according to a general embodiment of the invention, and which overcomes these disadvantages. The device 100 includes three components: a first component 102, a second component 104, and a third component 106. The components 102, 104, and 106 may also be referred to as means, which perform the functionalities ascribed to their respective components 102, 104, and 106 herein. A customer having a current checkout session places a physical coupon on or in the first component 102. The first component 102 scans a coupon associated with a current checkout session, but not until the physical coupon is no longer accessible by the customer. Therefore, the customer cannot take back the physical coupon after the coupon has been scanned and instead substitute a different coupon in its place. Once the first component 102 has scanned the coupon, and the coupon has been validated, the coupon is moved from the first component 102 to the second component 104.

In some situations, the coupon may fail validation. For example, the customer may present a coupon for an item that has not been scanned. In general, coupons can be presented just for items that are going to be purchased, which means that coupons have to be presented after the items to which they pertain have been scanned. If validation of the coupon fails, then the first component 102 returns the coupon. It is noted that the first component 102 returning the physical coupon encompasses the situation where the first component 102 permits the customer to again access the coupon and retrieve it. That is, the first component 102 may not actually give the coupon back to the customer, but by permitting the customer to take back the coupon, the first component 102 is said in this situation to return the coupon.

The second component 104 temporarily holds all the coupons associated with just the current checkout session, and not with any other checkout session, such as previous checkout sessions. The coupons are normally inaccessible to the customer when held in the second component 104. However, if the current checkout session is voided in some way—either entirely or partially—or the current checkout session is otherwise completed unsuccessfully, the customer or an employee is provided with access to the second component 104 to retrieve one or more of the coupons, possibly with employee oversight. Because the second component 104 holds just the coupons associated with the current checkout session, the customer does not have to, and is not permitted to, access the coupons that were used by previous customers in previous checkout sessions.

Once the current checkout session has been successfully completed, all the coupons associated with the current checkout session are moved in unison from the second component 104 to the third component 106. However, as noted above, if the current checkout session is not successfully completed, then a user, such as the customer or an employee, is permitted to retrieve the physical coupon and any other physical coupons associated with just the current checkout session, from the second component 104. The user, in other words, does not have to look through physical coupons associated with any other checkout session to retrieve just the coupons associated with the current checkout session.

The current checkout session may not be successfully completed for a variety of different reasons. The exemplary reason presented herein is that the session has been voided; for instance, the customer may decide that he or she does not in fact want to purchase the items that are being checked out, such that the entire session is cancelled. Alternatively, a session may not be successfully completed if it has been suspended, or the employee may need to view one or more of the coupons if any of them are questioned in any way. A checkout session may be suspended where the checkout equipment has failed, in which case the session is suspended for completion on different checkout equipment, such as a different cash register.

The third component 106 indefinitely stores all the coupons that have been scanned by the device, including the coupons associated with the current checkout session and coupons associated with other checkout sessions. Customers are not permitted access to the third component 106. This includes the customer associated with the current checkout session, as well as customer associated with other checkout sessions. Rather, employees of the retail establishment in question may periodically access the third component 106 to remove all the coupons that are being stored there.

As depicted in FIG. 1, the first component 102 can be physically located over the second component 104, and the second component 104 can be physically located over the third component 106. Therefore, a physical coupon can move from the first component 102 to the second component 104 by being released from the first component 102, such that the coupon drops from the first component 102 to the second component 104. Likewise, the physical coupons associated with the current checkout session can be moved in unison from the second component 104 to the third component 106 by being released from the second component 104, such that they drop from the second component 104 to the third component 106.

In operation and in use, a customer having a current checkout session places coupons on a coupon-by-coupon basis (i.e., individually) on or in the first component 102. After the first component 102 scans a given coupon, and after the coupon is validated, the coupon is moved from the first component 102 to the second component 104. This process is repeated for each coupon that the customer has. A coupon is validated when it has been properly scanned, and matched to an item that the customer is purchasing. For example, the customer may first scan all the items that he or she is purchasing, such as by using a self checkout. Thereafter, the customer may use the device 100 to scan all the coupons. Each coupon is matched against the items, to make sure that each coupon applies to one or more of the items that the customer is purchasing.

At the end of the current checkout session, the second component 104 will therefore hold all coupons that the customer has used in the current checkout session. If the current checkout session is partially or completely voided—or otherwise is completed unsuccessfully—then the customer and/or the employee will have access to the second component 104 to retrieve one or more of the coupons. Otherwise, when the current checkout session is successfully completed, all the coupons held by the second component 104 are moved in unison to the third component 106. The third component 106 thus stores all the coupons that have been redeemed using the device 100, typically over a relatively large number of checkout sessions, until an employee removes the coupons from the third component 106.

Two specific embodiments of the device 100 are now described in detail. However, those of ordinary skill within the art can appreciate that other embodiments of the device 100 are also within the scope of the claims presented below. For example, other embodiments can employ a combination of the two specific embodiments described herein, or other types of approaches to realize a first component 102, a second component 104, and a third component 106 that perform the functionality described herein.

Figure 2:
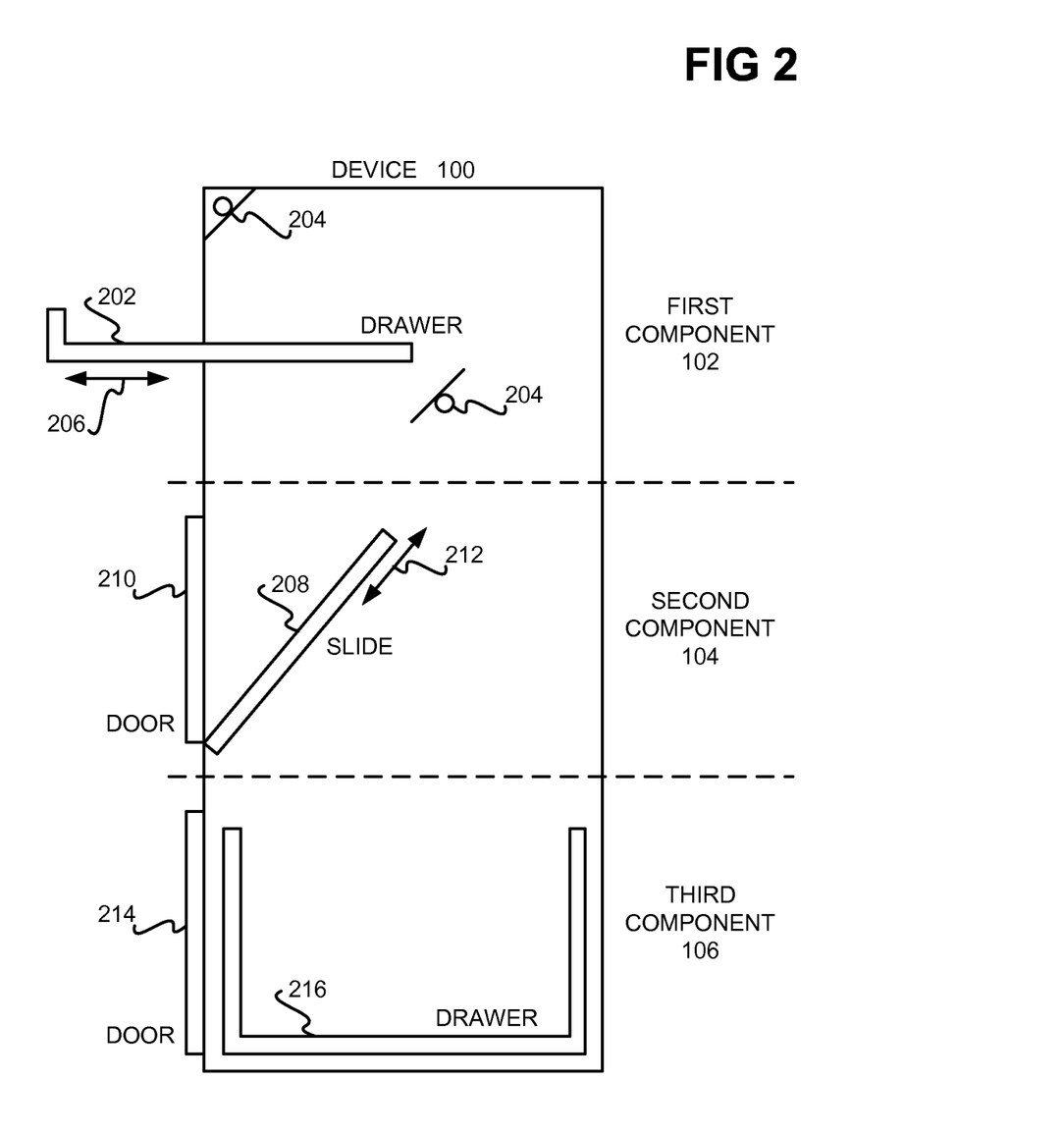
FIG. 2 is a diagram of a device, according to a specific embodiment of the present invention.

FIG. 2 shows the device 100, according to a first specific embodiment of the invention. The first component 102 includes a retractable drawer 202, and one or more scanning mechanisms 204. The drawer 202 can extend outwards from the first component 102 and into the first component 102, as depicted by the bi-directional arrow 206. When a customer wants to redeem a physical coupon, the drawer 202 extends outwards so that the customer can place the coupon on the bottom of the drawer 202, such as responsive to the customer indicating at a self checkout that he or she wants to redeem a coupon, and/or by pressing a button, and so on. The drawer 202 then retracts inwards, either automatically or by the customer pressing a button or otherwise indicating that a coupon has been placed on the drawer 202. When the drawer 202 has retracted inwards, the customer is unable to access the coupon.

While the retractable drawer 202 is retracting inwards back into the first component 102, or after the drawer 202 has been retracted completely inwards into the first component 102, the scanning mechanisms 204 scan the physical coupon. The drawer 202 is desirably formed from a transparent material, so that regardless of whether the coupon is placed face-side up or face-side down on the drawer 202, one of the scanning mechanisms 204 is able to scan the physical coupon. Scanning the physical coupon can include, for instance, scanning a bar code present on the physical coupon. The scanning mechanisms 204 in this respect may include or be one or more light-emitting diodes (LED's) of the appropriate color, and a detector to detect the light reflected by the bar code.

Once the scanning mechanisms 204 have scanned the physical coupon, and the coupon has been validated, the physical coupon is released from the bottom of the drawer 202 to drop to the second component 104. However, if validation of the coupon has failed, then the physical coupon is not released from the drawer 202. Rather, the drawer 202 returns the coupon to the customer. For example, the drawer 202 may automatically extend outwards so that the customer can retrieve the coupon, or the customer may be instructed to pull open the drawer 202 to retrieve the coupon.

Figure 3A:
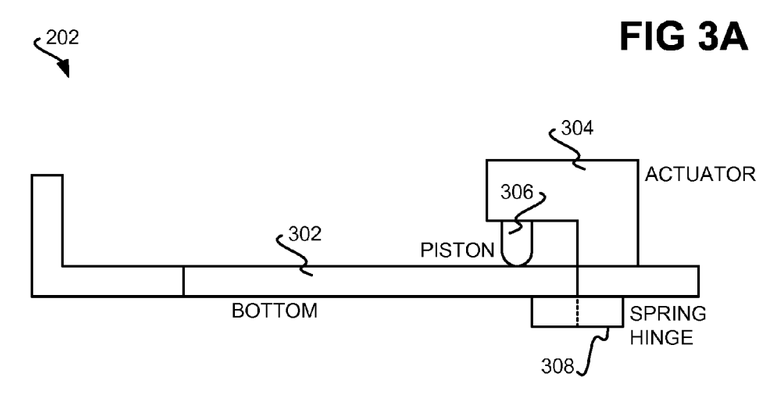
FIGS. 3A and 3B show a representative retractable drawer of the device of FIG. 2, according to an embodiment of the present invention.
Figure 3B:
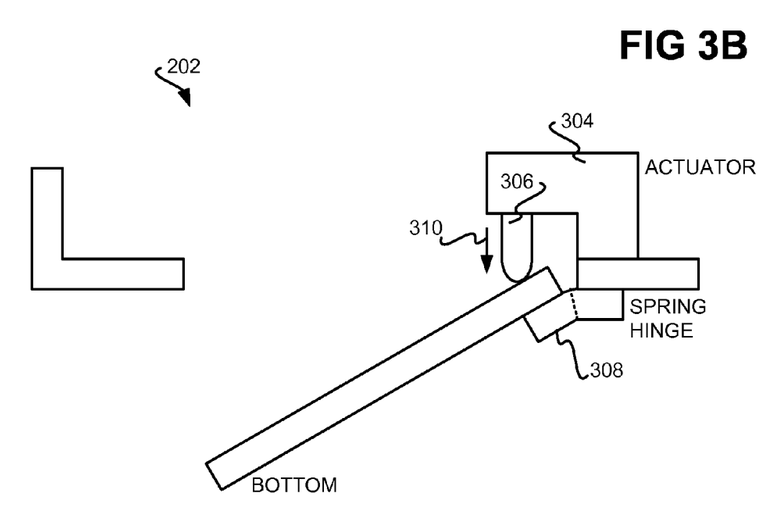

FIGS. 3A and 3B show how the retractable drawer 202 can release a physical coupon from a bottom portion 302 so that the coupon drops to the second component 104, according to an embodiment of the invention. Those of ordinary skill within the art can appreciate that other embodiments of the invention can employ other types of mechanisms to release a coupon, instead of that which is shown in FIGS. 3A and 3B. The bottom portion 302 has a first position as depicted in FIG. 3A, and a second position as depicted in FIG. 3B. The drawer 202 includes an actuator 304, a piston 306, and a spring hinge 308, in addition to the bottom portion 302.

In FIG. 3A, the bottom portion 302 of the retractable drawer 202 is maintained in the first position by the spring hinge 308. That is, the spring force of the spring hinge 308 is such that the default position of the bottom portion 302 is the first position. In this position, the actuator 304 has not actuated the piston 306, and the piston 306 remains in a retracted position. The drawer 202 is extended from and retracted into the device 100 when the bottom portion 302 is in the first position of FIG. 3A, and furthermore the coupon placed on the bottom portion 302 is scanned while the bottom portion 302 is in the first position of FIG. 3A.

In FIG. 3B, the bottom portion 302 of the retractable drawer 202 is maintained in the second position by the actuator 304 actuating the piston 306 so that it extends downwards, as indicated by the arrow 310. The piston 306 pushes against the bottom portion 302, and overcomes the spring force of the spring hinge 308 to move the bottom portion 302 to the second position of FIG. 3B. The coupon that was previously placed on the bottom portion 302 in the first position of FIG. 3A thus slides off the bottom portion 302 in the second position of FIG. 3B, and in this way is released from the first component 102 to drop to the second component 104.

For the bottom portion 302 of the retractable drawer 202 to revert to the first position of FIG. 3A after having been in the second position of FIG. 3B, the actuator 304 no longer actuates the piston 306, such that it retracts inwards again, as depicted in FIG. 3A. The spring force of the spring hinge 308 then reverts the bottom portion 302 back to the first position of FIG. 3A, since the piston 306 is no longer actuated and thus no longer overcomes the spring force of the spring hinge 308.

Referring back to FIG. 2, the second component 104 includes a retractable slide 208 and a lockable door 210. As depicted in FIG. 2, the retractable slide 208 is in a downwards position. However, by a motor or other suitable mechanism, the retractable slide 208 can retract upwards into an upwards position, as well as back downwards into the downwards position, along the slope indicated by the bi-directional arrow 212. The lockable door 210 is normally closed and locked to prevent the customer from accessing coupons associated with the current checkout session held by the second component 104.

At the beginning of the current checkout session, or at the end of a previous checkout session, the retractable slide 208 is moved to the downwards position. When a physical coupon has been scanned in the first component 102 and is released by the first component 102, the coupon lands on the slide 208. In the downwards position, the bottom edge of the slide 208 is in contact with the door 210 or with an edge of a housing of the device 100. Therefore, the slide 208 holds the physical coupon when the coupon is released by the first component 102 and drops onto the slide 208. As physical coupons of a current checkout session are scanned by the first component 102, they are individually dropped onto the slide 208, where the coupons are temporarily held.

Because the lockable door 210 is normally closed and locked, the customer of the current checkout session is unable to access and take back the coupons that he or she has already scanned. When the current checkout session is successfully completed, the retractable slide 208 is moved to the upwards position. Because the slide 208 is at an angle, the coupons associated with the current checkout session that were on the slide 208 slide off (i.e., are released from the second component 204), and drop into the third component 106.

However, if the current checkout session is voided in whole or in part—or the current checkout session is otherwise completed unsuccessfully—then the lockable door 210 may be unlocked, either automatically by the device 100, or by an employee. In this situation, the door 210 can be opened, and the customer and/or the employee permitted to retrieve one or more of the coupons held by the retractable slide 208. In fact, the coupons may indeed slide off the slide 208 and outside of the device 100 when the door 210 is opened. It is noted in this situation that the customer and/or the employee is only able to retrieve the coupons that are temporarily being held by the slide 208, and not any coupons within the third component 106, which remains inaccessible even when the door 210 is opened. That is, a user such as the customer and/or the employee is able to retrieve the coupons associated with the current checkout session, without having to look through any coupons associated with other checkout sessions.

The third component 106 includes a lockable door 214, and may also include a drawer 216. The coupons associated with the current checkout session that are released from the second component 104 drop into the drawer 216, which already may store coupons associated with previous checkout sessions. The lockable door 214 is normally closed and locked. As such, no customers are able to access the coupons stored in the drawer 216. Rather, an employee, or another user other than a customer, may periodically unlock and open the door 214, to retrieve the coupons stored in the third component 106 and thus to empty the drawer 216 when it becomes full.

Figure 4:
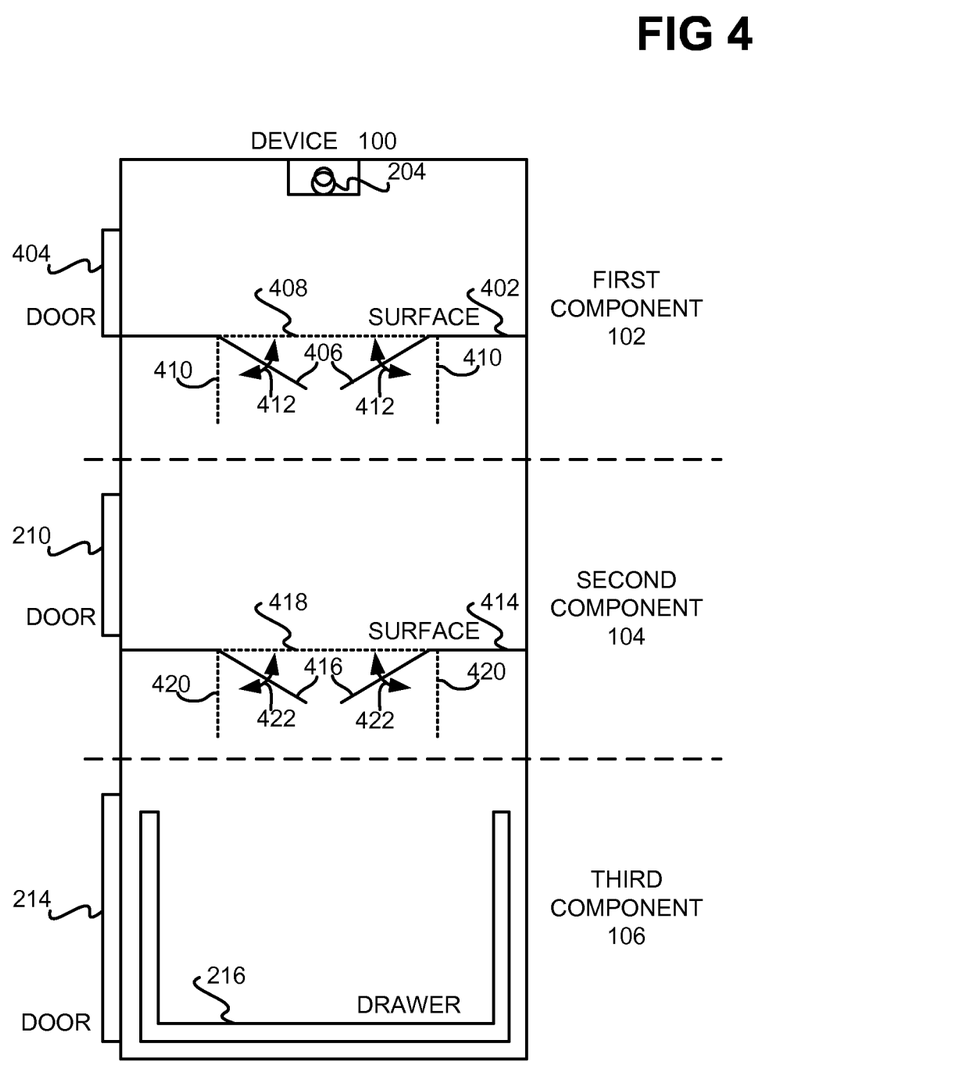
FIG. 4 is a diagram of a device, according to another specific embodiment of the present invention.

FIG. 4 shows the device 100, according to a second specific embodiment of the invention. The first component 102 includes a surface 402 and a door 404, as well as one of the scanning mechanisms 204 that have been described above in FIG. 2. The surface 402 includes one or more surface portions 406 that each have a first position 408 and a second position 410, which are indicated by dotted lines in FIG. 4, and between which the portions 406 can move or transition, as indicated by the bi-directional arrows 412. Each surface portion 406 can transition or move between the first and the second positions 408 and 410 in the manner that has been described in relation to FIGS. 3A and 3B above, or in a different manner. The surface portions 406 are depicted in FIG. 4 as transitioning between the first and the second positions 408 and 410 for illustrative convenience, but in actuality are typically maintained in the first position 408 or in the second position 410.

When a customer wants to redeem a physical coupon, the customer opens the door 404 and places the coupon on the surface portions 406 of the surface 402, where the surface portions 406 are in the first position 408. The customer cannot access the coupons stored or held in the second component 104 and the third component 106 at this time, due to the fact that the surface portions 406 are in the first position 408. After the customer has placed the coupon on the surface portions 406 has closed the door 404, the scanning mechanism 204 scans the coupon. It is noted that the scanning mechanism 204 does not scan the coupon unless the door 404 is closed, which prevents the customer from quickly switching out the coupon for a different one after the coupon has been scanned.

Once the physical coupon has been scanned, but where the coupon has failed validation, then the coupon is returned to the customer. For example, the customer may be instructed to open the door 404 and remove the coupon. Alternatively, the door 404 may be mechanically powered, and may automatically open, in conjunction with instructions to the customer to remove the coupon from the surface 402.

Once the physical coupon has been scanned, and where the coupon has been validated, the surface portions 406 are caused to rotate downwards from the first position 408 to the second position 410. In the second position 410, the surface portions 406 thus release and drop the coupon to the second component 104. That is, the surface portions 406 act as a sort of "trap door," and when this trap door is opened, the coupon previously placed on the surface portions 406 falls to the second component 104. It is noted that the surface portions 406 release the coupon to the second component 104 as soon as scanning has been completed, so that the customer does not have sufficient time to open the door 404 and switch out the coupon that has been scanned for a different one.

The second component 104 includes a surface 414, as well as the lockable door 210 that has been described above in relation to FIG. 2. Like the surface 402 of the first component 102, the surface 414 of the second component 104 includes one or more surface portions 416 that each have a first position 418 and a second position 420, which are indicated by dotted lines in FIG. 4, and between which the portions 416 can move or transition, as indicated by the bi-directional arrows 422. Also like the surface portions 406 of the first component 102, the surface portions 416 of the second component 404 can transition or move between the first and the second positions 418 and 420 in the manner that has been described in relation to FIGS. 3A and 3B above, or in a different manner. The surface portions 416 are depicted in FIG. 4 as transitioning between the first and the second positions 418 and 420 for illustrative convenience, but in actuality are typically maintained in the first position 418 or in the second position 420.

At the beginning of the current checkout session, or at the end of a previous checkout session, the surface portions 416 are moved to the first position 418. When a physical coupon has been scanned in the first component 102 and is released by the first component 102, the coupon lands on the surface portions 416 of the surface 414. Therefore, as physical coupons of a current checkout session are scanned by the first component 102, they are individually dropped onto the surface portions 416 of the surface 414, where the coupons are temporarily held.

Because the lockable door 210 is normally closed and locked, the customer of the current checkout session is unable to access and take back the coupons that he or she has already scanned. When the current checkout session is successfully completed, the surface portions 416 are moved, rotated, or otherwise transitioned to the second position 420. In the second position 420, the surface portions 416 release and drop the coupons associated with the current checkout session to the third component 106. That is, the surface portions 416, like the surface portions 406 of the first component 102, act as a sort of "trap door," and when this trap door is opened, the coupons currently being held by the surface portions 416 fall to the third component 106.

However, if the current checkout session is voided in whole or in part—or the current checkout session otherwise is completed unsuccessfully—the lockable door 210 may be unlocked, either automatically by the device 100, or by an employee. In this situation, the door 210 can be opened, and the customer and/or the employee permitted to retrieve one or more of the coupons held by the surface portions 416 of the surface 414. It is noted in this situation that the customer is only able to retrieve the coupons that are temporarily being held by the surface portions 416, and not any coupons within the third component 106, which remains inaccessible even when the door 210 is opened, due to the surface portions 416 being in the first position 418. That is, a user such as the customer and/or the employee is able to retrieve the coupons associated with the current checkout session, without having to look through any coupons associated with other checkout sessions.

As noted above in relation to FIG. 2, the third component 106 includes the lockable door 214, and may also include the drawer 216. The coupons associated with the current checkout session that are released from the second component 104 drop into the drawer 216, which already may store coupons associated with previous checkout sessions. The lockable door 214 is normally closed and locked. As such, no customers are able to access the coupons stored in the drawer 216. Rather, an employee, or another user other than a customer, may periodically unlock and open the door 214, to retrieve the coupons stored in the third component 106 and thus to empty the drawer 216 when it becomes full.

Figure 5A:
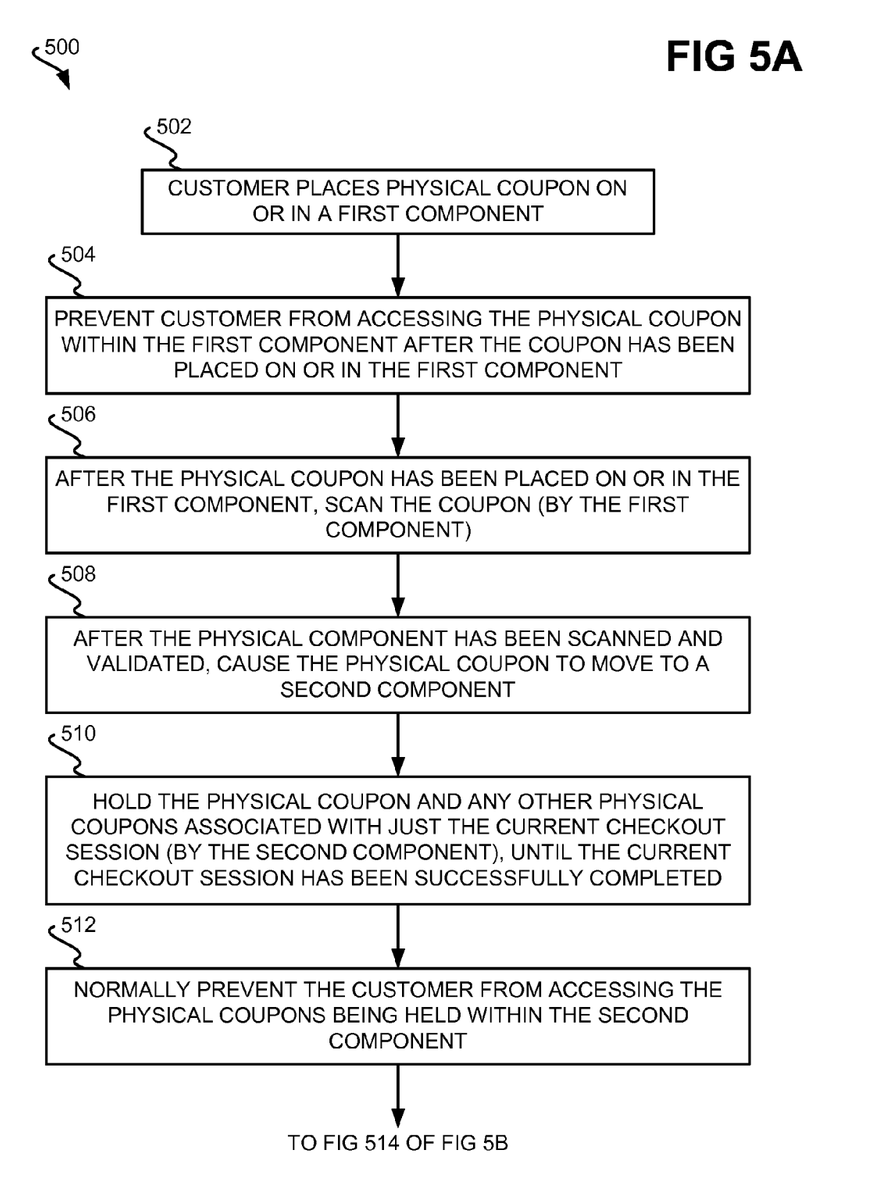
FIGS. 5A and 5B are flowcharts of a method, according to an embodiment of the present invention.
Figure 5B:
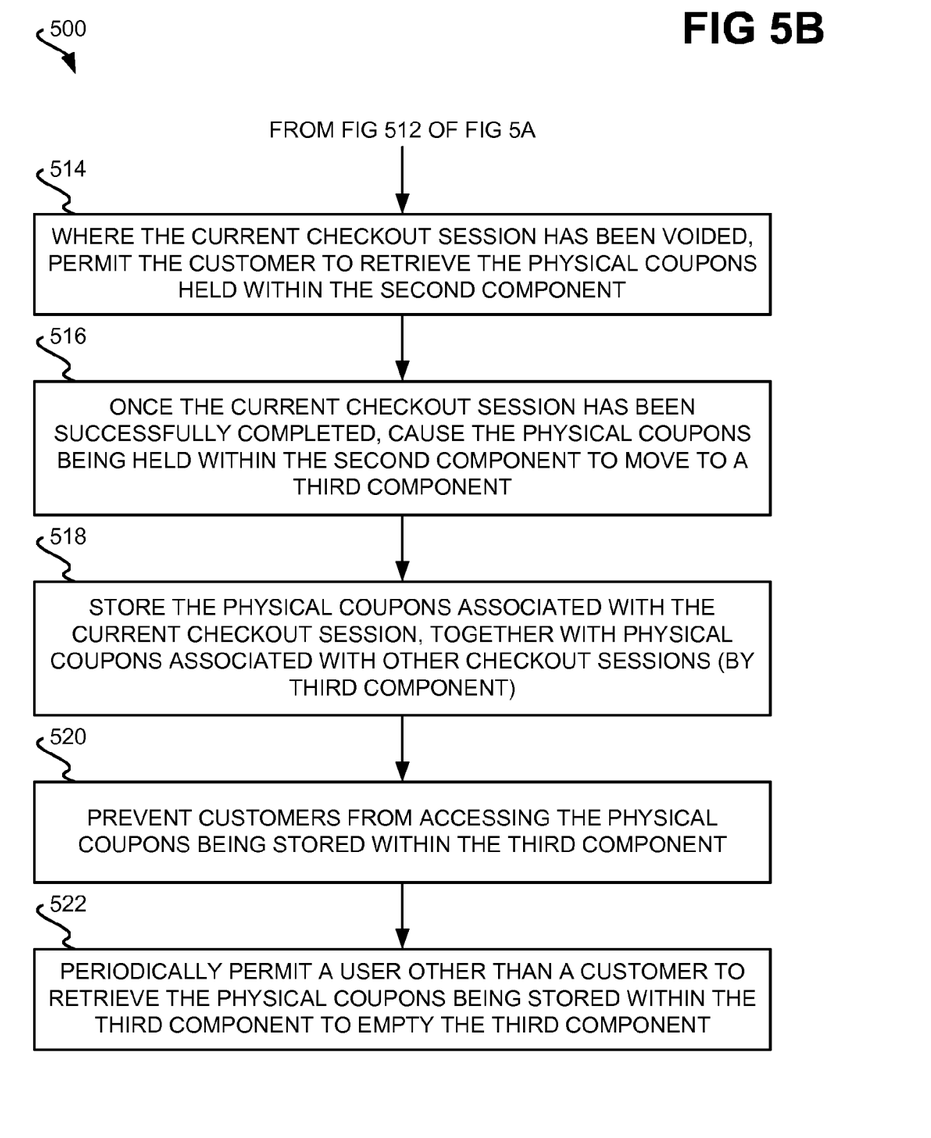

In conclusion, FIGS. 5A and 5B shows a method 500 for operating the device 100 of FIGS. 1, 2, and/or 3, according to an embodiment of the invention. The customer places a physical coupon on or in the first component 102 (502). The customer is prevented from accessing the physical coupon within the first coupon after the coupon has been placed on or in the first component 102 (504). The physical coupon is then scanned by the first component 102 (506), and validated. It is noted that if the physical coupon is not successfully validated, then the first component returns the coupon, as has been described above, and which is not specifically depicted in FIGS. 5A and 5B.

After the physical coupon has been scanned and validated (successfully), the physical coupon is caused to move from the first component 102 to the second component 104 (508). This physical coupon, as well as any other physical coupons associated with just the current checkout session and that were previously scanned, are held by the second component 104, until the current checkout session has been successfully completed (510). The customer is normally prevented from accessing the physical coupons associated with just the current checkout session that are temporarily being held by the second component 104 (512). However, where the current checkout session has been voided (or otherwise has been completed unsuccessfully), the customer and/or the employee is permitted to retrieve one or more of these coupons from the second component 104 (514). That is, the second component 104 permits a user such as the customer or an employee to retrieve the physical coupon and any other physical coupons associated with just the current checkout session where the current checkout session has been unsuccessfully completed, without the user having to look through the additional physical coupons associated with the other checkout sessions.

Once the current checkout session has been successfully completed, the physical coupons being held by the second component 104 are caused to move from the second component 104 to the third component 106 (516). The third component 106 stores the physical coupons associated with the current checkout session, as well as physical coupons that were previously moved to the third component 106 and thus that are associated with prior (i.e., other) checkout sessions (518). Customers, including the customer associated with the current checkout session and the customers associated with the prior checkout sessions, are prevented from accessing the physical coupons being stored within the third component 106 (520). However, an authorized user, other than a customer, is permitted to periodically retrieve the physical coupons stored within the third component 106 in order to empty the third component 106 (522).

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A device comprising:
   a first component to scan a physical coupon associated with a current checkout session;
   a second component to which the physical coupon is moved from the first component after the first component scans the physical coupon and the physical coupon has been validated, the second component to hold the physical coupon and any other physical coupons associated with just the current checkout session until the current checkout session has been successfully completed; and,
   a third component to which the physical coupon and any other physical coupons associated with the current checkout session are moved in unison from the second component once the current checkout session has been successfully completed, the third component to store the physical coupon and any other physical coupons associated with the current checkout session, together with additional physical coupons associated with other checkout sessions,
   wherein the first component is to return the physical coupon where validation of the physical coupon has failed,
   wherein the second component permits a user to retrieve the physical coupon and any other physical coupons associated with just the current checkout session where the current checkout session has been unsuccessfully completed, without the user having to look through the additional physical coupons associated with the other checkout sessions,
   wherein the first component comprises:
   a door that is opened by a customer associated with the current checkout session to place the physical coupon inside the first component and to then close the door;
   a scanning mechanism to scan the physical coupon upon the physical coupon being placed inside the first component and the door being closed, such that the scanning mechanism does not scan the physical coupon unless the door is closed; and, a surface on which the customer is to place the physical coupon inside the first component, wherein a portion of the surface has a first position at which the physical coupon is scanned by the scanning mechanism, and a second position in which the portion rotates downward in relation to the first position to release and drop the physical coupon to the second component after the physical coupon has been scanned by the scanning mechanism and the physical coupon has been validated.

2. The device of claim 1, wherein a customer with whom the current checkout session is associated places the physical coupon on or in the first component, and the first component does not scan the physical coupon until the physical coupon is no longer accessible within the first component by the customer.

3. The device of claim 1, wherein the physical coupon and any other physical coupons associated with the current checkout session are inaccessible within the second component by a customer with whom the current checkout session is associated unless the current checkout session has been completed unsuccessfully.

4. The device of claim 1, wherein the physical coupon and any other physical coupons associated with the current checkout session, and the additional physical coupons associated with the other checkout sessions, are inaccessible within the third component by customers associated with the current checkout session and the other checkout sessions.

5. The device of claim 1, wherein the first component is physically located above the second component, and the second component is physically located above the third component, such that the physical coupon is to move from the first component to the second component by being dropped from the first component to the second component, and such that the physical coupon and any other physical coupons associated with the current checkout session are moved in unison from the second component to the third component by being dropped from the second component to the third component.

6. The device of claim 1, wherein the first component comprises:

a drawer that is extended from the first component for a customer associated with the current checkout session to place the physical coupon on a bottom of the drawer, such that the drawer is then retracted back into the first component; and, a scanning mechanism to scan the physical coupon upon retraction of the drawer back into the first component, wherein a portion of the bottom of the drawer has a first position at which the physical coupon is scanned by the scanning mechanism, and a second position in which the portion rotates downward in relation to the first position to release and drop the physical coupon to the second component after the physical coupon has been scanned by the scanning mechanism and the physical coupon has been validated.

7. The device of claim 1, wherein the second component comprises:

a retractable slide having a downwards position and an upwards position, wherein in the downwards position the retractable slide holds the physical coupon after being released and dropped by the first component, and holds any other physical coupons associated with just the current checkout session, wherein the retractable slide is moved from the downwards position to the upwards position once the current checkout session has been successfully completed, such that movement of the retractable slide from the downwards position to the upwards position releases the physical coupon and any other physical coupons associated with just the current checkout session for dropping into the third component.

8. The device of claim 7, wherein the second component further comprises a lockable door, wherein the lockable door is normally closed and locked while the current checkout session is occurring such that a customer with whom the current checkout session is associated is unable to access the physical coupon and any other physical coupons held by the retractable slide, and wherein the lockable door is unlocked and opened if the current checkout session has been completed unsuccessfully to permit one or more of the customer and an employee to retrieve the physical coupon and any other physical coupons held by the retractable slide.

9. The device of claim 1, wherein the second component comprises a surface having a first position and a second position, wherein in the first position the surface holds the physical coupon after being released and dropped by the first component, and holds any other physical coupons associated with just the current checkout session, and wherein the surface is transitioned from the first position to the second position once the current checkout session has been successfully completed, such that transitioning of the surface from the first position to the second position releases the physical coupon and any other physical coupons associated with just the current checkout session for dropping into the third component.

10. The device of claim 9, wherein the second component further comprises a lockable door, wherein the lockable door is normally closed and locked while the current checkout session is occurring such that a customer with whom the current checkout session is associated is unable to access the physical coupon and any other physical coupons held on the surface, and wherein the lockable door is unlocked and opened if the current checkout session has been completed unsuccessfully to permit one or more of the customer and an employee to retrieve the physical coupon and any other physical coupons held on the surface.

11. The device of claim 1, wherein the third component comprises a lockable door, wherein the lockable door is normally closed and locked to prevent customers associated with the current checkout session and the other checkout sessions from retrieving the physical coupon and any other physical coupons associated with the current checkout session, and the additional physical coupons associated with the other checkout sessions, and wherein the lockable door is opened by a user other than the customers to periodically retrieve the physical coupon and any other physical coupons associated with the current checkout session, and the additional physical coupons associated with the other checkout sessions.

12. A device comprising:

first means for scanning a physical coupon associated with a current checkout session;

second means to which the physical coupon is moved from the first means after the first means scans the physical coupon and the physical coupon has been validated, the second means for holding the physical coupon and any other physical coupons associated with just the current checkout session until the current checkout session has been successfully completed; and, third means to which the physical coupon and any other physical coupons associated with the current checkout session are moved in unison from the second means once the current checkout session has been successfully completed, the third means for storing the physical coupon and any other physical coupons associated with the current checkout session, together with additional physical coupons associated with other checkout sessions, wherein the first means is to return the physical coupon where validation of the physical coupon has failed, wherein the second means permits a user to retrieve the physical coupon and any other physical coupons associated with just the current checkout session where the current checkout session has been unsuccessfully completed, without the user having to look through the additional physical coupons associated with the other checkout sessions, wherein the first means comprises:
  a door that is opened by a customer associated with the current checkout session to place the physical coupon inside the first means and to then close the door;
  a scanning mechanism to scan the physical coupon upon the physical coupon being placed inside the first means and the door being closed, such that the scanning mechanism does not scan the physical coupon unless the door is closed; and
  a surface on which the customer is to place the physical coupon inside the first means,
    wherein a portion of the surface has a first position at which the physical coupon is scanned by the scanning mechanism, and a second position in which the portion rotates downward in relation to the first position to release and drop the physical coupon to the second means after the physical coupon has been scanned by the scanning mechanism and the physical coupon has been validated;

wherein the second means comprises a surface having a first position and a second position,
  wherein in the first position the surface holds the physical coupon after being released and dropped by the first means, and holds any other physical coupons associated with just the current checkout session,
  and wherein the surface is transitioned from the first position to the second position once the current checkout session has been successfully completed, such that transitioning of the surface from the first position to the second position releases the physical coupon and an other physical coupons associated with just the current checkout session for dropping into the third means.

13. The device of claim 12,
wherein the first means comprises:
  a drawer that is extended for a customer associated with the current checkout session to place the physical coupon on a bottom of the drawer, such that the drawer is then retracted; and,
  a scanning mechanism to scan the physical coupon upon retraction of the drawer,
    wherein a portion of the bottom of the drawer has a first position at which the physical coupon is scanned by the scanning mechanism, and a second position in which the portion rotates downward in relation to the first position to release and drop the physical coupon to the second means after the physical coupon has been scanned by the scanning mechanism and the physical coupon has been validated;

and wherein the second means comprises:
  a retractable slide having a downwards position and an upwards position,
    wherein in the downwards position the retractable slide holds the physical coupon after being released and dropped by the first means, and holds any other physical coupons associated with just the current checkout session,
    wherein the retractable slide is moved from the downwards position to the upwards position once the current checkout session has been successfully completed, such that movement of the retractable slide from the downwards position to the upwards position releases the physical coupon and any other physical coupons associated with just the current checkout session for dropping into the third means.

14. The device of claim 12, wherein the third means comprises a lockable door,
  wherein the lockable door is normally closed and locked to prevent customers associated with the current checkout session and the other checkout sessions from retrieving the physical coupon and any other physical coupons associated with the current checkout session, and the additional physical coupons associated with the other checkout sessions,
  and wherein the lockable door is opened by a user other than the customers to periodically retrieve the physical coupon and any other physical coupons associated with the current checkout session, and the additional physical coupons associated with the other checkout sessions.

15. A method comprising:
placing, by a customer, a physical coupon associated with a current checkout session in a first component of a device;
after the physical coupon has been placed on in the first component, scanning the physical coupon by the first component;
after the physical coupon has been scanned by the first component and after the physical coupon as scanned has been validated, causing the physical coupon to move from the first component to a second component of the device;
holding, by the second component, the physical coupon and any other physical coupons associated with just the current checkout session until the current checkout session has been successfully completed;
once the current checkout session has been successfully completed, causing the physical coupon and any other physical coupon associated with the current checkout session to move from the second component to a third component of the device; and,
storing, by the third component, the physical coupon and any other physical coupon associated with the current checkout session, together with additional physical coupons associated with other checkout sessions,
wherein the second component is to return the physical coupon where validation of the physical coupon has failed,
and where the second component permits a user to retrieve the physical coupon and any other physical coupons associated with just the current checkout session where the current checkout session has been unsuccessfully completed, without the user having to look through the additional physical coupons associated with the other checkout sessions, wherein the first component comprises:
a door that is opened by the customer associated with the current checkout session to place the physical coupon inside the first component and to then close the door;
a scanning mechanism to scan the physical coupon upon the physical coupon being placed inside the first component and the door being closed, such that the scanning mechanism does not scan the physical coupon unless the door is closed; and,
a surface on which the customer is to place the physical coupon inside the first component,
wherein a portion of the surface has a first position at which the physical coupon is scanned by the scanning mechanism, and a second position in which the portion rotates downward in relation to the first position to release and drop the physical coupon to the second component after the physical coupon has been scanned by the scanning mechanism and the physical coupon has been validated.

16. The method of claim 15, further comprising preventing the customer from accessing the physical coupon within the first component after the physical coupon has been placed in the first component, such that the physical coupon is scanned by the first coupon after the customer has been prevented from accessing the physical coupon from the first component.

17. The method of claim 15, further comprising:
normally preventing the customer from accessing the physical coupon and any other physical coupon associated with the current checkout session within the second component; and,
where the current checkout session has been completed unsuccessfully, permitting one or more of the customer and an employee to retrieve the physical coupon and any other physical coupon associated with the current checkout session from the second component.

18. The method of claim 15, further comprising:
preventing the customer associated with the current checkout session and other customers associated with the other checkout session from accessing the physical coupon and any other physical coupon associated with the current checkout session, and the additional physical coupons associated with the other checkout sessions, within the third component; and,
periodically permitting a user other than the customer and the other customers to retrieve the physical coupon and any other physical coupon associated with the current checkout session, and the additional physical coupons associated with the other checkout sessions, from the third component.

* * * * *